US012764069B2

(12) United States Patent
Kundur et al.

(10) Patent No.: US 12,764,069 B2
(45) Date of Patent: Oct. 13, 2026

(54) METHODS, DEVICES, AND COMPUTER-READABLE MEDIA FOR LOAD BALANCING IN PORT CHANNELS

(71) Applicant: Cisco Technology, Inc., San Jose, CA (US)

(72) Inventors: Amulya Kundur, Milpitas, CA (US); Avinash Shah, Pleasanton, CA (US); Pritam Baruah, Fremont, CA (US); Arul Murugan Manickam, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 199 days.

(21) Appl. No.: 18/765,672

(22) Filed: Jul. 8, 2024

(65) Prior Publication Data

US 2025/0317395 A1 Oct. 9, 2025

Related U.S. Application Data

(60) Provisional application No. 63/631,907, filed on Apr. 9, 2024.

(51) Int. Cl.
*H04L 47/125* (2022.01)
*H04L 61/256* (2022.01)

(52) U.S. Cl.
CPC .......... *H04L 47/125* (2013.01); *H04L 61/256* (2013.01)

(58) Field of Classification Search
CPC . H04L 47/125; H04L 61/256; H04L 45/7453; H04L 47/10; H04L 67/1023
See application file for complete search history.

(56) References Cited

U.S. PATENT DOCUMENTS 7,190,696 B1 * 3/2007 Manur ................ H04L 49/3009 370/392
8,014,278 B1 * 9/2011 Subramanian ........ H04L 47/125 370/235
8,259,585 B1 * 9/2012 S P ....................... H04L 45/125 370/237
9,246,810 B2 * 1/2016 Matthews ........... H04L 45/7453
9,906,592 B1 2/2018 Roitshtein et al.
10,574,577 B1 * 2/2020 Matthews ........... H04L 47/6215
(Continued)

FOREIGN PATENT DOCUMENTS

WO 2023011153 A1 2/2023

OTHER PUBLICATIONS

LAN Switching Configuration Guide, Cisco IOS XE Release 2 (Year: 2011).*

*Primary Examiner* — Madhu Woolcock
(74) *Attorney, Agent, or Firm* — Polsinelli P.C.

(57) ABSTRACT

Disclosed is technology that allows a user to configure different load balance hash functions for each port channel to perform more custom-designed load balancing for that port channel. For example, some port channels may benefit from flow-based load balancing, whereas others may benefit from Virtual Local Area Network (VLAN) based load balancing, or load balancing based on an inner source media access control address (MAC address) and destination MAC address, or other methods. The present technology therefore allows a user to configure a port channel with a specific hash function that causes load balancing of the network traffic in a manner specific to that port channel.

17 Claims, 7 Drawing Sheets

(56) References Cited

U.S. PATENT DOCUMENTS

| | | | | |
|---|---|---|---|---|
| 2006/0031506 | A1* | 2/2006 | Redgate | H04L 67/02 709/226 |
| 2009/0010167 | A1 | 1/2009 | Ma | |
| 2009/0187663 | A1* | 7/2009 | Salt | G06F 9/5027 709/227 |
| 2011/0085570 | A1* | 4/2011 | Kotha | H04L 45/7453 370/419 |
| 2014/0050091 | A1* | 2/2014 | Biswas | H04L 67/1023 370/235 |
| 2014/0198647 | A1* | 7/2014 | Chowdhury | H04L 47/41 370/235 |
| 2014/0219081 | A1* | 8/2014 | Natarajan | H04L 41/0659 370/228 |
| 2015/0049765 | A1* | 2/2015 | Tatsumi | H04L 49/118 370/401 |
| 2015/0078375 | A1* | 3/2015 | Hendel | H04L 45/7453 370/389 |
| 2015/0127809 | A1 | 5/2015 | Akella et al. | |
| 2016/0094643 | A1* | 3/2016 | Jain | H04L 45/44 709/226 |
| 2018/0309822 | A1* | 10/2018 | Baradaran | H04L 67/1008 |
| 2020/0007448 | A1* | 1/2020 | Mizrahi | H04L 47/125 |
| 2020/0151649 | A1* | 5/2020 | Wang | G06Q 10/063116 |
| 2020/0259748 | A1* | 8/2020 | Li | H04L 47/125 |
| 2021/0135993 | A1* | 5/2021 | Mittal | H04L 45/24 |
| 2021/0306254 | A1* | 9/2021 | Marrotte | H04L 45/42 |
| 2021/0314404 | A1 | 10/2021 | Glek | |
| 2022/0329525 | A1 | 10/2022 | Lu et al. | |
| 2022/0413893 | A1* | 12/2022 | Shen | H04L 45/74 |
| 2023/0188492 | A1* | 6/2023 | Shen | H04L 45/748 709/245 |
| 2025/0310114 | A1* | 10/2025 | Fettes | H04L 9/3236 |

* cited by examiner

METHODS, DEVICES, AND COMPUTER-READABLE MEDIA FOR LOAD BALANCING IN PORT CHANNELS

CROSS-REFERENCE TO RELATED APPLICATIONS

This application claims priority to U.S. Provisional Patent Application No. 63/631,907 filed on Apr. 9, 2024, the contents of which are hereby incorporated by reference in their entirety.

BACKGROUND

Port channels provide fault tolerance and bandwidth aggregation with their multiple member links. This provides redundancy in the event of one or more links being down. It also improves bandwidth usage by load balancing across available links. Currently, Layer 3 port channels are assigned a global load balancing algorithm for all port channels.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
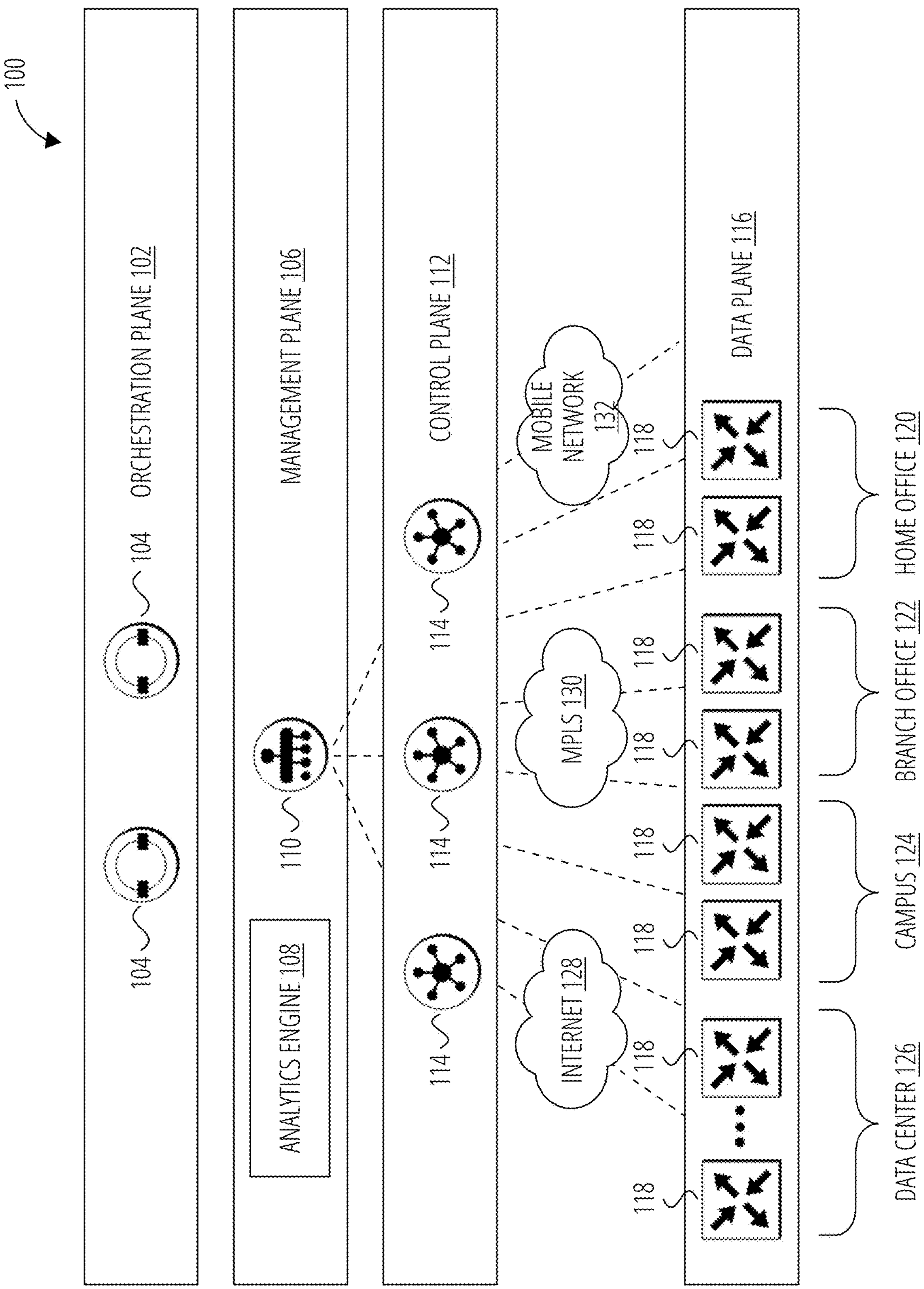
FIG. 1 illustrates an example of a high-level network architecture in accordance with some embodiments of the present technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

One size does not always fit all. A great example is in the technology of port channels, which are used to aggregate multiple network links into a single logical link, thereby increasing bandwidth and providing redundancy in case one of the links fails. A proper load balancing algorithm is crucial for appropriate bandwidth aggregation. But, at present, a user can only specify one of several different load-balancing modes that will apply globally across a network. For example, in catalyst edge devices, a user can configure a load balancing method globally for all Layer 3 port channels. Flow-based load balancing identifies different flows of traffic based on the key fields in the data packet, but it, too, can only be enabled globally. There does not exist a method of configuring each port channel with different load balancing methods.

That is, until now. The present technology allows a user to configure different load balance hash functions for each port channel to perform more custom-designed load balancing. For example, some port channels may benefit from flow-based load balancing, whereas others may benefit from Virtual Local Area Network (VLAN) based load balancing, or load balancing based on an inner source media access control address (MAC address) and destination MAC address, or based on a source IP address of a packet, or based on attributes of inner IP packets, or based on a combination of source IP addresses, destination IP addresses, and a transport layer port number of the network, or based on Layer 3 and Layer 4 elements of an inner packet of the network traffic. The present technology therefore allows a user to configure a port channel with a specific hash function that load balances the network traffic in a manner unique to that port channel.

Some examples are below. The present technology allows port channels to be configured for different use cases. The present inventors analyzed significant amounts of data to determine appropriate load balancing hash algorithms for the various use cases noted below. For example, transport-side load balancing in tunneling protocols requires an algorithm that balances load based on the contents of the inner packet, specifically the source and destination IP addresses. This approach is crucial because the outer header, which identifies the tunnel endpoints, remains consistent across sessions, making it unsuitable for effective load distribution.

A service side load balance algorithm derives from the nature of the local area network (LAN) traffic. For example, in environments where traffic patterns are dynamic and unpredictable, such as in data centers or large corporate networks, the algorithm can adapt by monitoring real-time traffic conditions and distributing loads accordingly. This ensures optimal resource utilization and maintains high levels of service performance and availability.

Direct Internet Access Network Address Translation (DIA-NAT) requires load balancing tailored to internet traffic, particularly for Software as a Service (SaaS) applications. To optimize performance, the selected algorithm uses the source IP address for load distribution to promote efficient and consistent delivery of traffic.

Other port channels can be configured for their specific needs and controlled by a network administrator. The attempted "one size fits all" approach can therefore be abandoned in favor of a more narrowly tailored load balancing hash algorithm that is custom selected for the specific port channel system at hand.

EXAMPLE EMBODIMENTS

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 106 with an analytics engine 108, a control plane 112, and a data plane 116. The orchestration plane 102 can assist in the automatic on-boarding of edge network devices 118 (e.g., switches, routers, etc.) in an overlay network. The orchestration plane 102 can include one or more physical or virtual network orchestrator appliances 104. The network orchestrator appliances 104 can perform the initial authentication of the edge network devices 118 and orchestrate connectivity between devices of the control plane 112 and the data plane 116. In some embodiments, the network orchestrator appliances 104 can also enable communication of devices located behind Network Address Translation (NAT). In some embodiments, physical or virtual Cisco® SD-WAN vBond appliances can operate as the network orchestrator appliances 104.

The management plane 106 can be responsible for central configuration and monitoring of a network. The management plane 106 can include one or more physical or virtual network management appliances 110. In some embodiments, the network management appliances 110 can provide centralized management of the network via a graphical user interface to enable a user to monitor, configure, and maintain the edge network devices 118 and links (e.g., internet transport network 128, MPLS network 130, 4G/Mobile network 132) in an underlay and overlay network. The network management appliances 110 can support multi-tenancy and enable centralized management of logically isolated networks associated with different entities (e.g., enterprises, divisions within enterprises, groups within divisions, etc.). Alternatively or in addition, the network management appliances 110 can be a dedicated network management system for a single entity. In some embodiments, physical or virtual Cisco® SD-WAN vManage appliances can operate as the network management appliances 110.

The control plane 112 can build and maintain a network topology and make decisions on where traffic flows. The control plane 112 can include one or more physical or virtual network control appliances 114. The network control appliances 114 can establish secure connections to each edge network device 118 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network control appliances 114 can operate as route reflectors. The network control appliances 114 can also orchestrate secure connectivity in the data plane 116 between and among the edge network devices 118. For example, in some embodiments, the network control appliances 114 can distribute crypto key information among the edge network devices 118. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network control appliances 114.

The data plane 116 can be responsible for forwarding packets based on decisions from the control plane 112. The data plane 116 can include the edge network devices 118, which can be physical or virtual edge network devices. The edge network devices 118 can operate at the edges various network environments of an organization, such as in one or more data centers 126, campus networks 124, branch office networks 122, home office networks 120, and so forth, or in the cloud (e.g., Infrastructure as a Service (IaaS), Platform as a Service (PaaS), SaaS, and other cloud service provider networks). The edge network devices 118 can provide secure data plane connectivity among sites over one or more wide area network (WAN) transports, such as via one or more internet transport networks 128 (e.g., Digital Subscriber Line (DSL), cable, etc.), MPLS networks 130 (or other private packet-switched network (e.g., Metro Ethernet, Frame Relay, Asynchronous Transfer Mode (ATM), etc.), mobile networks 132 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 118 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 118.

Figure 2:
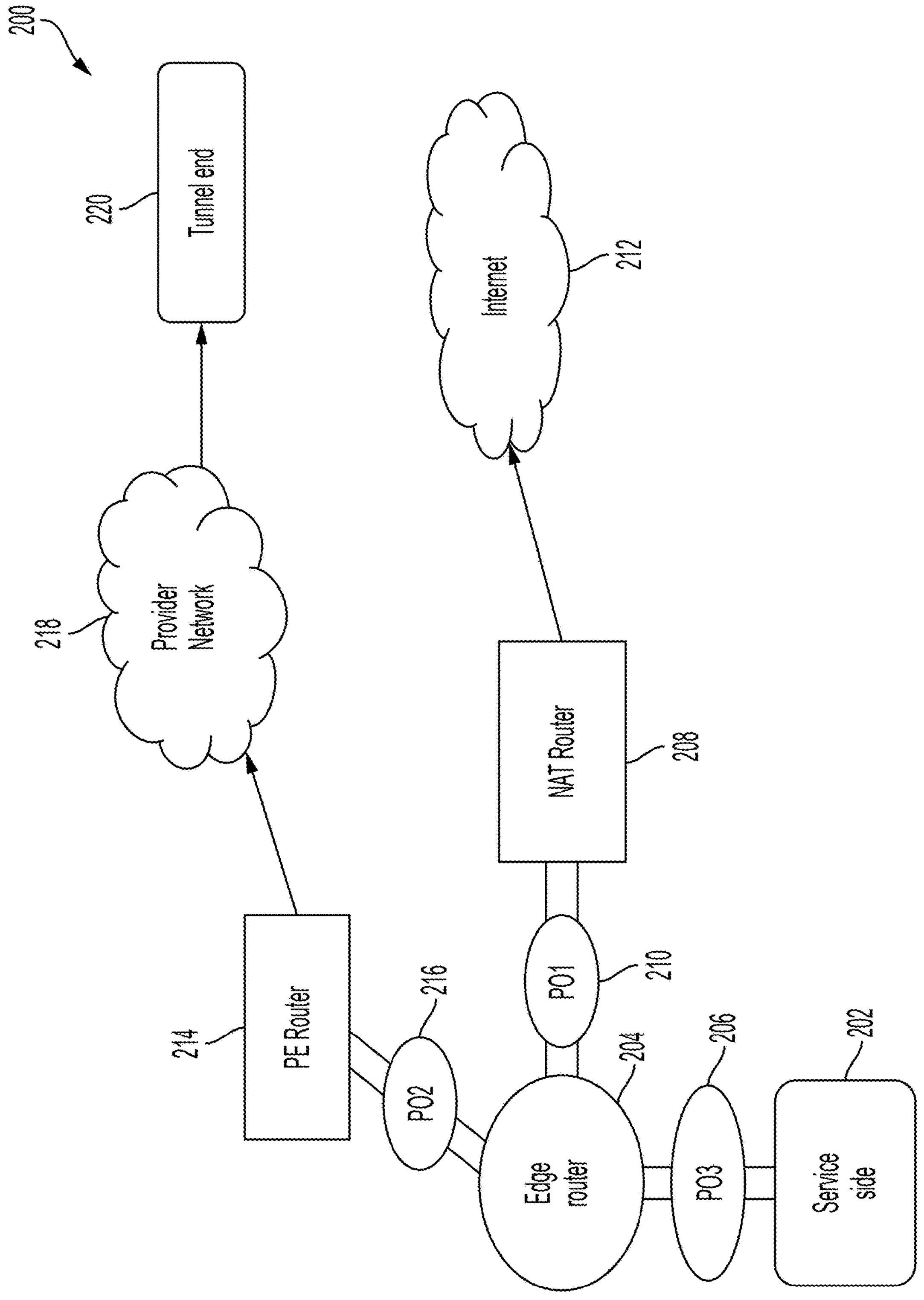
FIG. 2 illustrates a schematic diagram of port channels within a simple network according to some embodiments of the present technology.

FIG. 2 illustrates a schematic diagram of port channels within a network 200 according to some embodiments of the present technology. As shown, the network 200 includes a service side 202 connected to an edge router 204 through a first port channel 206. Along a first path, the edge router 204 can be linked to a network address translation router, also referred to as an NAT router 208. The NAT router 208 can be coupled to the edge router 204 by a second port channel 210. The NAT router can route network traffic to a variety of locations, such as the internet 212.

Along a second path, the edge router 204 can be coupled to a provider edge router, also referred to as a PE router 214. The edge router 204 can be so coupled by a third port channel 216. The PE router 214 can then route traffic through a provider network 218 to a tunnel end 220.

The network 200 shown in FIG. 2 illustrates the complicated nature of port channel technology and the different network segments that port channels connect together. For example, the first port channel 206 acts as a link that load balances and aggregates bandwidth for services and network applications. The second port channel 210 acts as a link from the edge router 204 to the NAT router 208, continuing to facilitate efficient routing and address translation, and ensuring that internal network traffic can be securely and effectively communicated to external networks. The third port channel 216 acts as a link to the provider side of the network 200. These configurations may benefit from a different load balancing method and, as a result, a different hash algorithm used to provide load balancing capabilities.

The typical network configuration today would configure the first port channel 206, the second port channel 210, and the third port channel 216 with the same hash algorithm. As disclosed herein, a network administrator can configure the network 200 using load balancing algorithms that are more narrowly tailored for the specific port channel at hand. This configuration can occur via a network controller (e.g., an SD-WAN controller) or the network administrator can configure the port channel on the device itself. Specifically, the network 200 may have a default setting where the network administrator has configured the first port channel 206 and the second port channel 210 within the network 200 to perform load balancing on network traffic using a default algorithm. Following that, the network administrator may determine that one of the port channels may benefit from a more port channel-specific hash function for load balancing purposes. Here, the network administrator may cause the first port channel 206 to change the default algorithm to a first hash algorithm that load balances the network traffic using a first hash function. However, the second port channel 210 may benefit more from a different hash algorithm. Therefore, the network administrator may cause the second port channel 210 to change the default algorithm to a second hash algorithm that load balances the network traffic using a second hash function different from the first hash function. The network administrator may then execute the changes by configuring the first port channel 206 and the second port channel 210 to load balance the network traffic using the first hash function and the second hash function, respectively.

In the example above, the first port channel 206 and second port channel 210 benefit from more customized hash functions and load balancing methods. Of course, the third port channel 216 may also be configured using different hash functions more tailored to the specifics of the third port channel 216. The specific hash algorithm and/or load balancing method may be manually determined by the network administrator or, in some embodiments, may be determined in any manner by the network controller or devices or applications associated with the network controller. In some embodiments, the network controller is coupled to devices or executes applications that analyze network data to determine the appropriate hash function for the specific port channel. Any other manner of determining the appropriate hash function for the specific port channel may be implemented without departing from the spirit and scope of the present technology.

Figure 3:
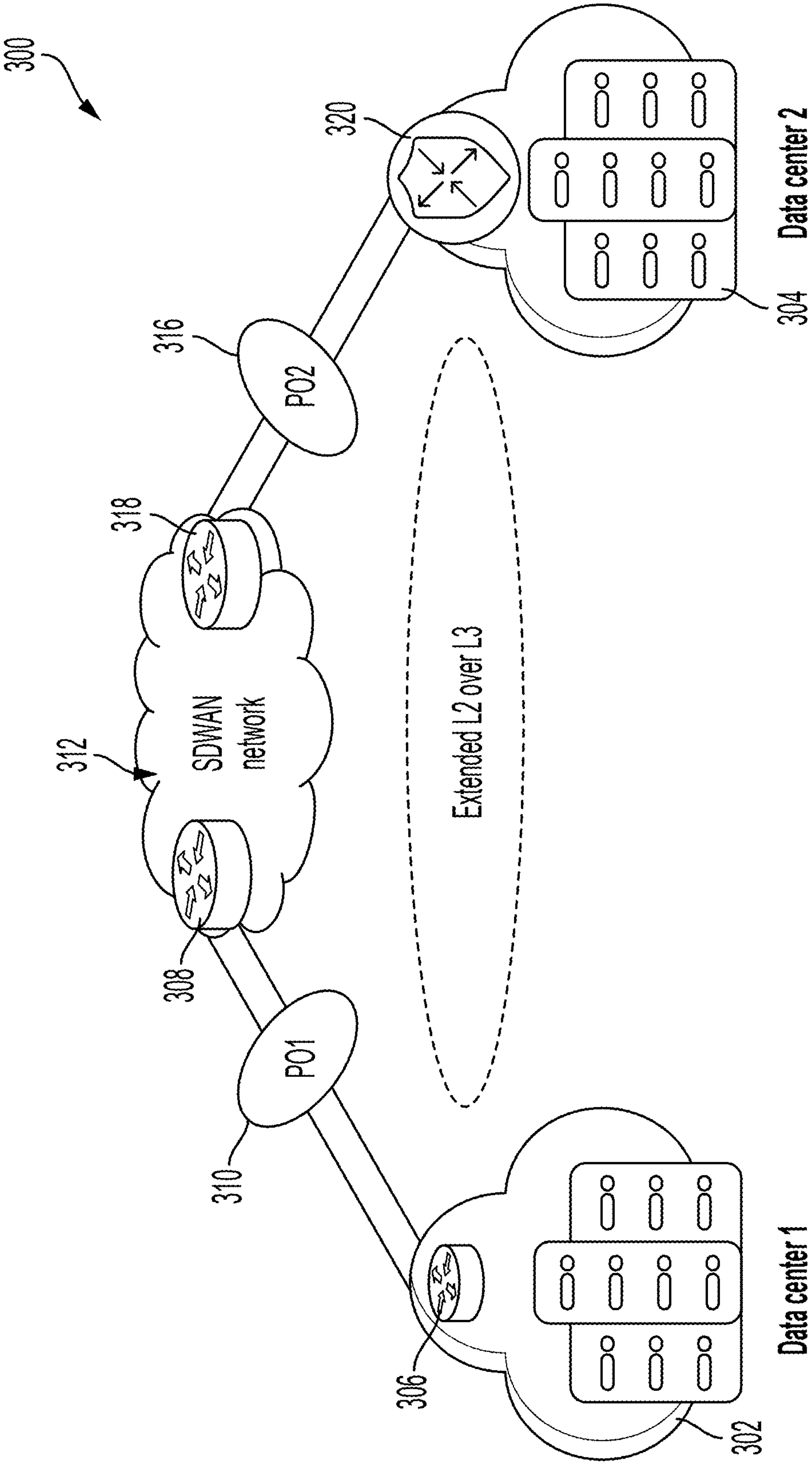
FIG. 3 illustrates a schematic diagram of a wide area network coupling two data centers according to some embodiments of the present technology.

FIG. 3 illustrates a schematic diagram of a wide area network coupling two data centers according to some embodiments of the present technology. This configuration can be referred to as the Layer 2 VPN configuration. As shown, a network 300 includes a first data center 302 and a second data center 304. The first data center 302 includes a first data center edge router 306 that routes traffic to and from the first data center 302. The first data center edge router 306 can be communicably coupled to a first SD-WAN edge router 308 via a first port channel 310. An SD-WAN network 312 can communicate with the second data center 304 in a variety of ways. For example, the network 300 may include a second port channel 316 that communicably couples a second SD-WAN edge router 318 with a firewall 320 of the second data center 304.

The network 300 is a wide area network (WAN) that supports Layer 2 connectivity over Layer 3 networks. That is, the network enables devices to communicate as if they are on the same local network even though they are geographically dispersed, using technologies such as Multiprotocol Label Switching (MPLS), Layer 2 Tunneling Protocol (L2TP), or Virtual Extensible LAN (VXLAN) to encapsulate Layer 2 frames within Layer 3 packets. This allows for seamless integration and extension of LAN environments across the wider internet or private WAN connections, maintaining the benefits of Layer 2 protocols, like broadcast and multicast, over long distances.

Load balancing over such a WAN requires a specific hash algorithm to carry out efficient load balancing. In particular, the present inventors discovered that a WAN that supports Layer 2 connectivity over Layer 3 networks can efficiently perform load balancing on network traffic within its port channels using a hash algorithm based on an inner source MAC address and a destination MAC address. This is because the inner MAC addresses, which are preserved in Layer 2 frames encapsulated within Layer 3 packets, provide a consistent basis for traffic distribution among the links. By focusing on these MAC addresses rather than outer Layer 3 IP addresses, the hash algorithm can more effectively maintain session persistence and enhance bandwidth utilization, especially in environments where IP addresses may change due to dynamic routing or network reconfigurations.

Figure 4:
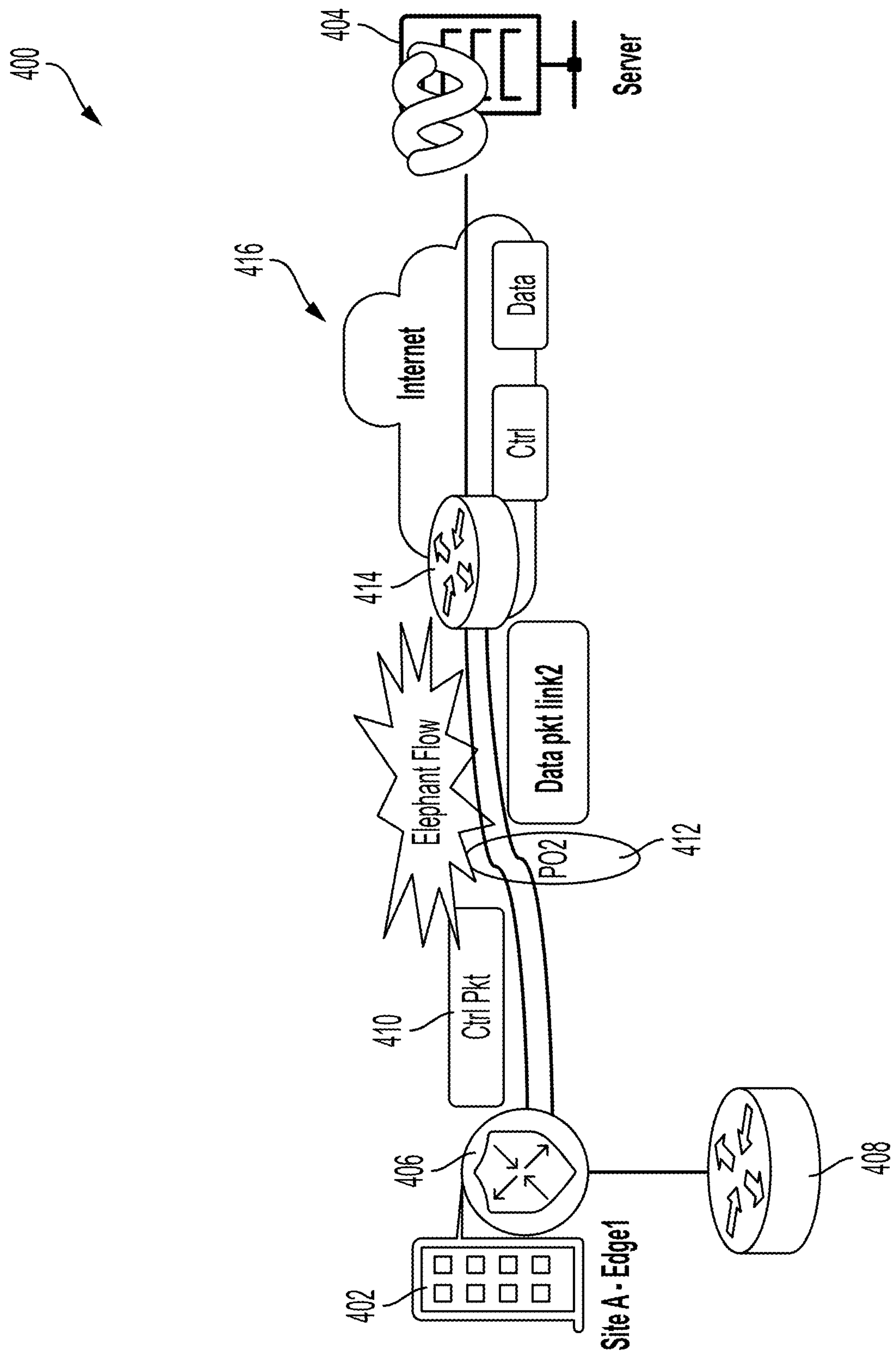
FIG. 4 illustrates a schematic diagram of an edge router connecting to a server for communication purposes according to some embodiments of the present technology.

FIG. 4 illustrates a schematic diagram of an edge router connecting to a server for communication purposes according to some embodiments of the present technology. As shown, a network 400 includes a first site 402 coupled to a server 404. For example, the site can include a firewall 406 with a site router 408 for routing traffic, for example a packet 410, across a port channel 412. The packet 410 can be routed through the port channel 412 to an internet router 414 within the internet 416, and ultimately to the server 404.

The use case of FIG. 4 involves a network that utilizes Network Address Translation-Direct Internet Access (NAT-DIA) capabilities. In this scenario, all connections should use the same member link of the port channel. If Layer 4 global load balancing is configured, it may lead to control and data packets being routed through different links. For example, control packets might use one link of the port channel and data packets may use another link. To address this inconsistency, implementing source IP load balancing is beneficial. Particularly in networks with NAT-DIA capabilities, the port channel can achieve effective and efficient load balancing by using a hash algorithm that focuses on the source IP address of each packet.

Figure 5:
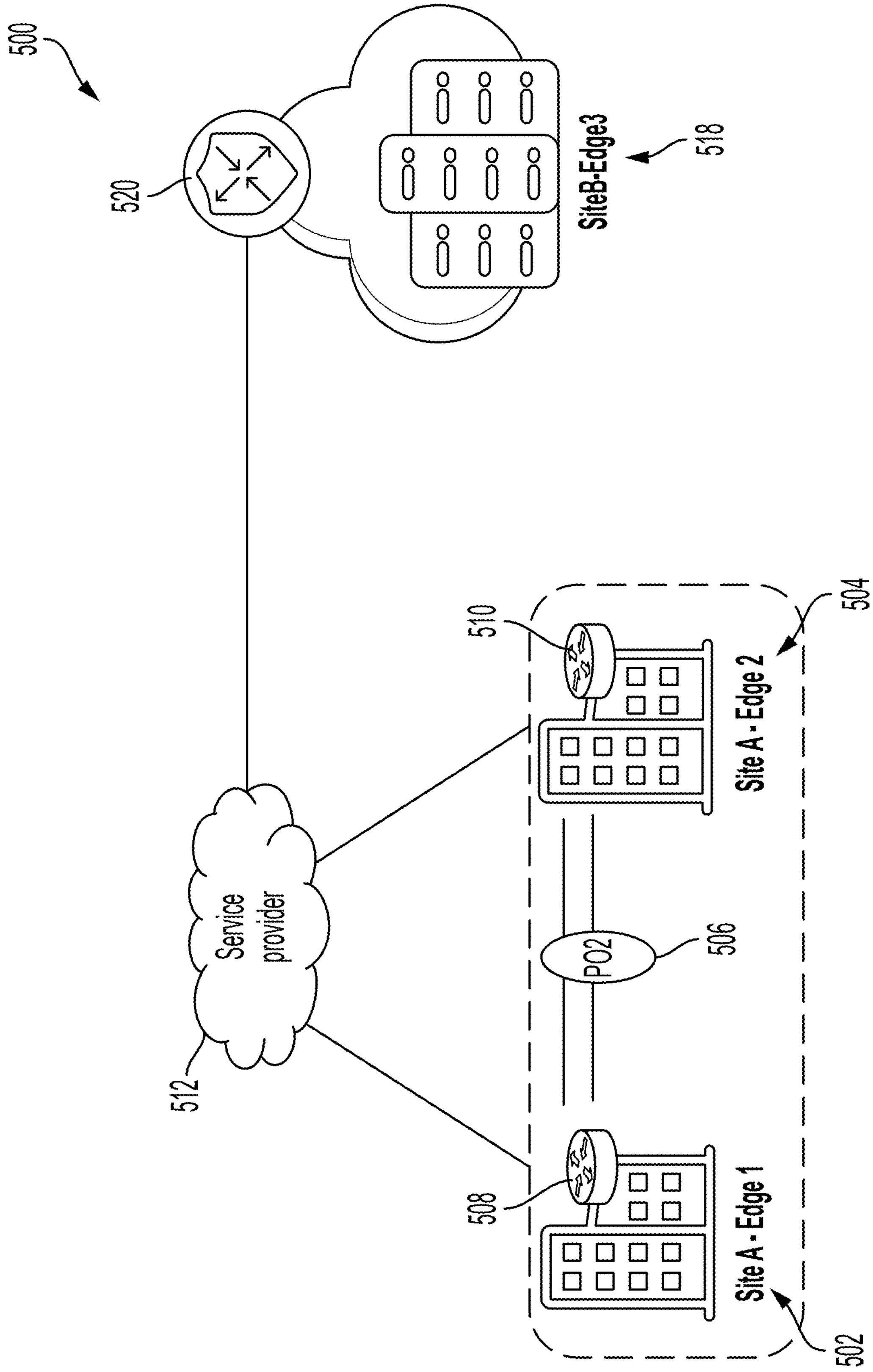
FIG. 5 illustrates a schematic diagram of multiple edge routers coupled by a port channel according to some embodiments of the present technology.

FIG. 5 illustrates a schematic diagram of a network 500 including multiple edge routers coupled by a port channel according to some embodiments of the present technology. As shown, a first site 502 can be coupled to a second site 504. For example, a port channel 506 can couple a first edge router 508 of the first site 502 to a second edge router 510 of the second site 504. A service provider 512 can provide network services to the first site 502 and the second site 504, and to a third site 518. For example, the service provider 512 can provide services to the third site 518 through a firewall 520 of the third site 518. This configuration is generally referred to as a "box to box" configuration. This network configuration aims to provide box-level redundancy and enable stateful application seamless failover. The first site 502 and the second site 504 can be directly connected via port channel 506, which synchronizes the application states (e.g., firewall, NAT) and session states, ensuring consistency across both sites.

This configuration is similar to an SD-WAN tunnel case, where the outer source IP address and destination IP address of the packet would be the same. Inner tuple load balancing can therefore be beneficial for the port channels in this configuration. For example, if the port channel 506 is a box to box port channel, it would be beneficial for the hash algorithm associated with the port channel 506 to calculate a hash based on Layer 3 and Layer 4 elements of an inner packet of the network traffic. For example, the hash algorithm could calculate the hash based on the source and destination IP addresses and the Transmission Control Protocol (TCP) and/or User Datagram Protocol (UDP) ports from the inner packet. This approach ensures that even if the outer IP addresses are identical across multiple sessions, the unique identifiers of the inner packet will provide the basis for distributing traffic more effectively across the links in the port channel 506.

There are other use cases where a port channel specific hash function may be advantageous. For example, transport-side port channels can benefit from a hash function that calculates a hash based on attributes of inner IP packets. This is because, in the case of tunnels, the source IP address and destination IP address would be the same for all traffic. If the port channels are configured to load balance traffic based on source IP address or destination IP address, the packets would take on the same member link and therefore oversubscribe that link. Calculating a hash based on the attributes of inner IP packets therefore avoids this issue. For example, the port channel could calculate a hash based on the inner IP packet's source and destination IP addresses and possibly include Layer 4 attributes like TCP or UDP ports. By focusing on the inner attributes, the port channel avoids the pitfall of oversubscription on a single link, which can occur when only the outer IP addresses are used for load balancing in tunnel scenarios.

Another use case is where the port channel is a service side port channel. There, the service side load balance algorithm derives from the nature of the LAN traffic. For example, the service side load balance algorithm derives from the characteristics of the Local Area Network (LAN) traffic, such as the type of services accessed, the patterns of traffic distribution, and the specific applications in use. For example, the algorithm could consider factors like session persistence requirements, application-specific data flows, and priority levels of services to optimize resource allocation and enhance the performance of critical applications. Specifically, for example, the port channel can implement a hash algorithm that calculates a hash based on a combination of source IP addresses, destination IP addresses, and a transport layer port number of the network.

Figure 6:
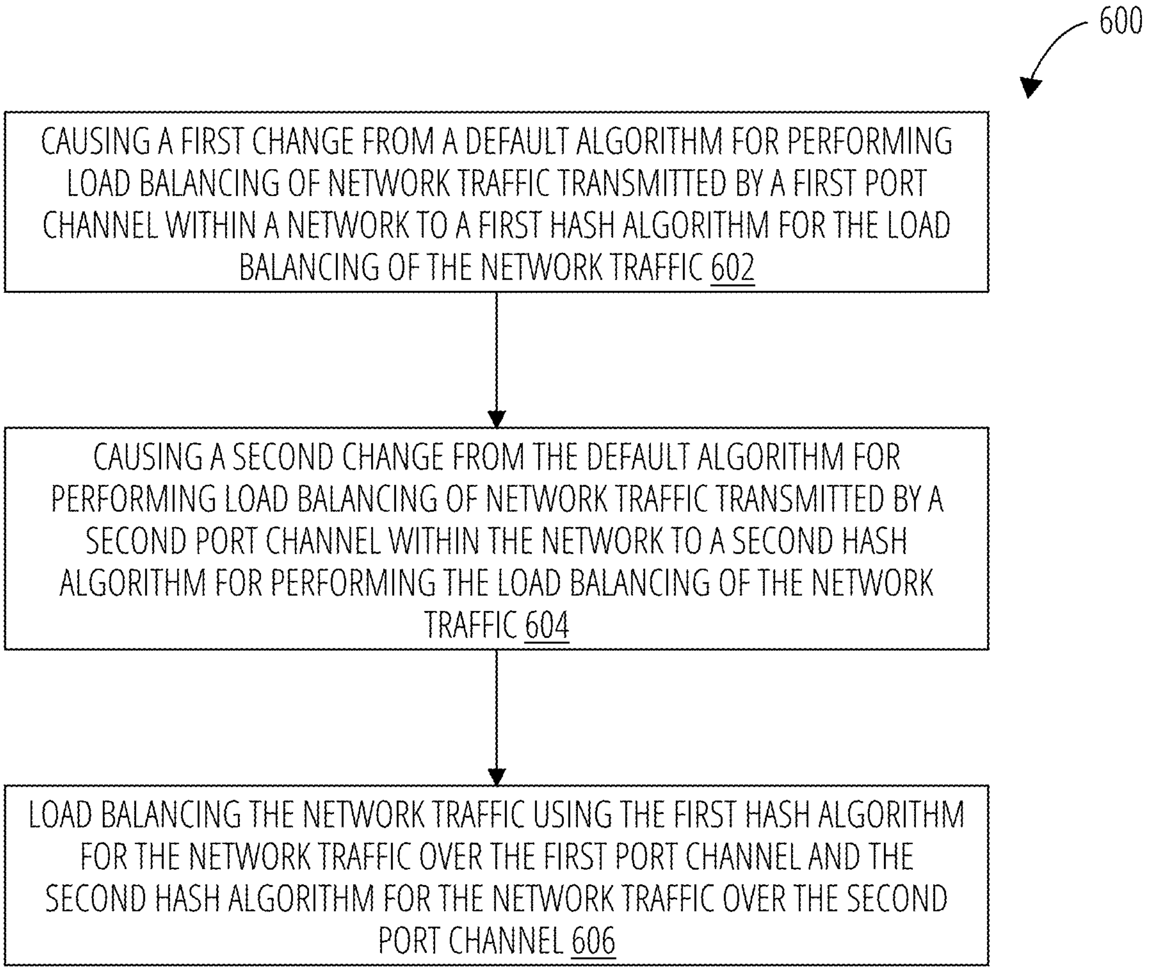
FIG. 6 illustrates a routine according to some embodiments of the present technology.

FIG. 6 illustrates an example routine 600 in accordance with one embodiment. Although the example routine 600 depicts a particular sequence of operations, the sequence may be altered without departing from the scope of the present disclosure. For example, some of the operations depicted may be performed in parallel or in a different sequence that does not materially affect the function of the routine 600. In other examples, different components of an example device or system that implements the routine 600 may perform functions at substantially the same time or in a specific sequence.

According to some examples, the routine 600 includes causing a first change from a default algorithm for performing load balancing of network traffic transmitted by a first port channel within a network to a first hash algorithm for the load balancing of the network traffic at block 602. For example, a network controller may cause a first change from a default algorithm for performing load balancing of network traffic transmitted by a first port channel within a network to a first hash algorithm for the load balancing of the network traffic. For example, a network administrator can effect this change using a SD-WAN network controller, or on the device itself. The various port channel-specific load balancing hash functions are discussed above with respect to the Layer 2 VPN configuration, NAT-DIA configuration, transport-side configuration, service side configuration, and box to box configuration. The default algorithm can be, for example, flow-based load balancing or VLAN-based load balancing.

According to some examples, the routine 600 includes causing a second change from the default algorithm for performing load balancing of network traffic transmitted by a second port channel within the network to a second hash algorithm for performing the load balancing of the network traffic at block 604. The second hash algorithm is different from the first hash algorithm. For example, a network controller may cause a second change from the default algorithm for performing load balancing of network traffic transmitted by a second port channel within the network to a second hash algorithm for performing the load balancing of the network traffic. For example, a network administrator can effect this change using a SD-WAN network controller, or on the device itself.

According to some examples, the routine 600 includes load balancing the network traffic using the first hash algorithm for the network traffic over the first port channel and the second hash algorithm for the network traffic over the second port channel at block 606. For example, a port channel (such as the first port channel 206, the second port channel 210, or the third port channel 216) can load balance the network traffic using the first hash algorithm for the network traffic over the first port channel and the second hash algorithm for the network traffic over the second port channel.

The result of this configuration is allowing each port channel to utilize a hash algorithm and hash function that are narrowly tailored to the configuration of the network in which the port channel is located. The port channel is not at the mercy of a global or default configuration, but can be configured to implement any load balancing algorithm based on network administrator input. For example, the network administrator can configure the algorithm in the policy of the SD-WAN network. For example, this policy can be configured through an application stored on a non-transitory computer-readable storage medium embedded within a controller, e.g., an SD-WAN controller.

The present inventors therefore saw what others did not. That is, the present inventors reviewed extensive data and found specific network configurations where load balancing algorithms are not a good fit, but other configurations where certain load balancing algorithms are optimum for that configuration. Others skilled in the art did not see this need for granularity, and implemented broader default methods that were square pegs fitting into round holes. None of those skilled in the art ever considered implementing different hash functions for different port channels in a network based on the unique needs of the port channel.

Figure 7:
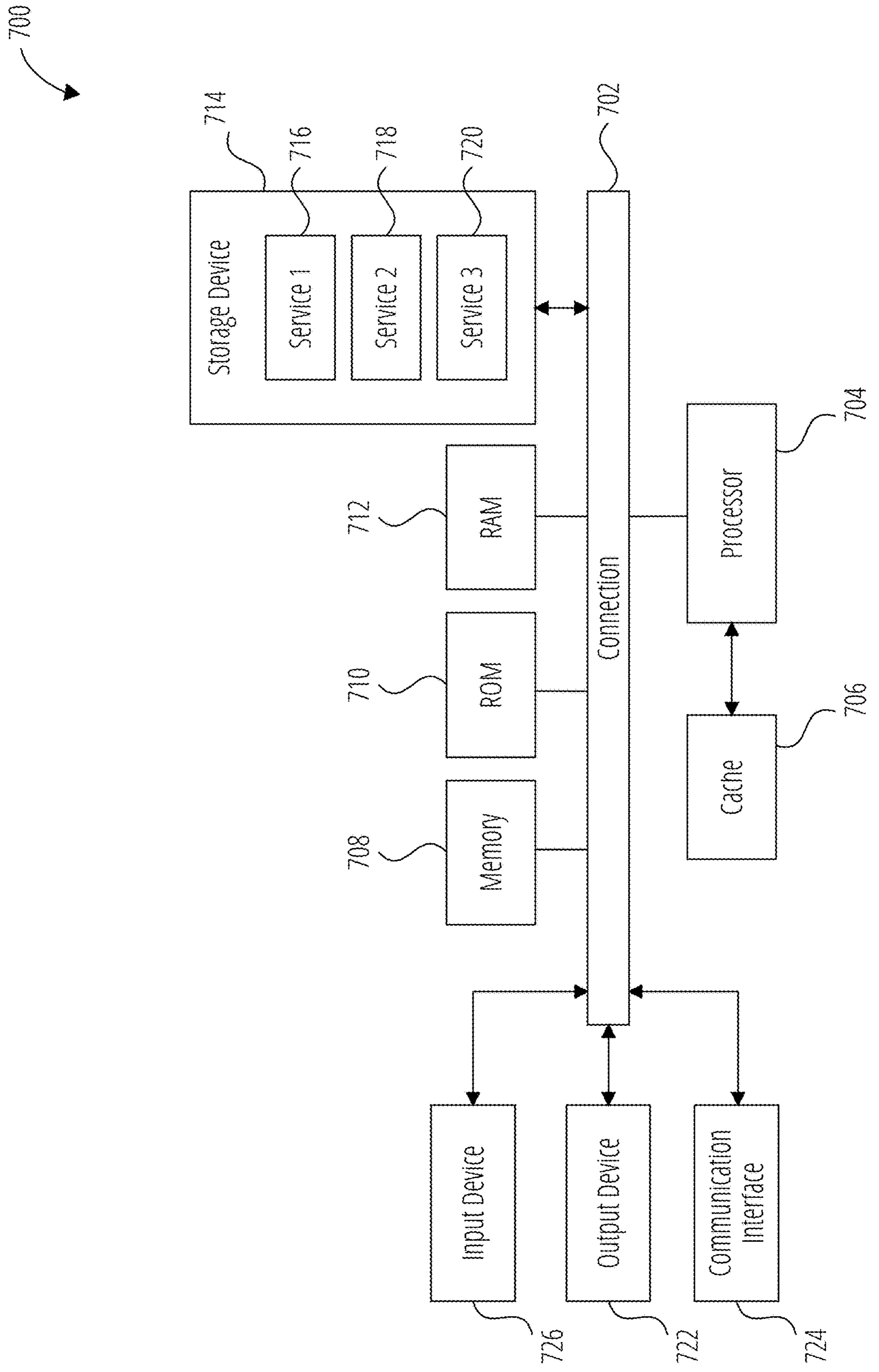
FIG. 7 shows an example of a system for implementing certain aspects of the present technology.

FIG. 7 shows an example of computing system 700, which can be for example any computing device making up a controller or router, for example a controller or router of an SD-WAN network, or any component thereof in which the components of the system are in communication with each other using connection 702. Connection 702 can be a physical connection via a bus, or a direct connection into processor 704, such as in a chipset architecture. Connection 702 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 700 includes at least one processing unit (CPU or processor) 704 and connection 702 that couples various system components including system memory 708, such as read-only memory (ROM) 710 and random access memory (RAM) 712 to processor 704. Computing system 700 can include a cache of high-speed memory 706 connected directly with, in close proximity to, or integrated as part of processor 704.

Processor 704 can include any general purpose processor and a hardware service or software service, such as services 716, 718, and 720 stored in storage device 714, configured to control processor 704 as well as a special-purpose processor where software instructions are incorporated into the actual processor design. Processor 704 may essentially be a completely self-contained computing system, containing multiple cores or processors, a bus, memory controller, cache, etc. A multi-core processor may be symmetric or asymmetric.

To enable user interaction, computing system 700 includes an input device 726, which can represent any number of input mechanisms, such as a microphone for speech, a touch-sensitive screen for gesture or graphical input, keyboard, mouse, motion input, speech, etc. Computing system 700 can also include output device 722, which can be one or more of a number of output mechanisms known to those of skill in the art. In some instances, multimodal systems can enable a user to provide multiple types of input/output to communicate with computing system 700. Computing system 700 can include communication interface 724, which can generally govern and manage the user input and system output. There is no restriction on operating on any particular hardware arrangement, and therefore the basic features here may easily be substituted for improved hardware or firmware arrangements as they are developed.

Storage device 714 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 714 can include software services, servers, services, etc., that when the code that defines such software is executed by the processor 704, it causes the system to perform a function. In some embodiments, a hardware service that performs a particular function can include the software component stored in a computer-readable medium in connection with the necessary hardware components, such as processor 704, connection 702, output device 722, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspect 1. A method comprising: causing a first change from a default algorithm for performing load balancing of network traffic transmitted by a first port channel within a network to a first hash algorithm for the load balancing of the network traffic; causing a second change from the default algorithm for performing load balancing of network traffic transmitted by a second port channel within the network to a second hash algorithm for performing the load balancing of the network traffic, the second hash algorithm is different from the first hash algorithm; and load balancing the network traffic using the first hash algorithm for the network traffic over the first port channel and the second hash algorithm for the network traffic over the second port channel.

Aspect 2. The method of Aspect 1, wherein the first port channel is within a wide area network (WAN) that supports Layer 2 connectivity over Layer 3 networks, and wherein the first hash algorithm calculates a hash based on an inner source MAC address and destination MAC address.

Aspect 3. The method of Aspect 1, wherein the network utilizes Network Address Translation-Direct Internet Access (NAT-DIA) capabilities, and wherein the first hash algorithm calculates a hash based on a source IP address of a packet.

Aspect 4. The method of Aspect 1, wherein the first port channel is a transport-side port channel, and wherein the first hash algorithm calculates a hash based on attributes of inner IP packets.

Aspect 5. The method of Aspect 1, wherein the first port channel is a service side port channel, and wherein the first hash algorithm calculates a hash based on a combination of source IP addresses, destination IP addresses, and a transport layer port number of the network.

Aspect 6. The method of Aspect 1, wherein the first port channel is a box to box port channel, and wherein the first hash algorithm calculates a hash based on Layer 3 and Layer 4 elements of an inner packet of the network traffic.

Aspect 7. The method of Aspect 1, wherein the first hash algorithm and the second hash algorithm are configurable from a controller.

Aspect 8. A controller comprising: a storage configured to store instructions; and at least one processor configured to execute the instructions and cause the at least one processor to: configure a first port channel and a second port channel within a network to perform load balancing on network traffic using a default algorithm; cause the first port channel to change the default algorithm to a first hash algorithm that load balances the network traffic using a first hash function; cause the second port channel to change the default algorithm to a second hash algorithm that load balances the network traffic using a second hash function different from the first hash function; and configure the first port channel and the second port channel to load balance the network traffic using the first hash function and the second hash function, respectively.

Aspect 9. The controller of Aspect 8, wherein the first port channel is within a wide area network (WAN) that supports Layer 2 connectivity over Layer 3 networks, and wherein the first hash algorithm calculates a hash based on an inner source MAC address and destination MAC address.

Aspect 10. The controller of Aspect 8, wherein the network utilizes Network Address Translation-Direct Internet Access (NAT-DIA) capabilities, and wherein the first hash algorithm calculates a hash based on a source IP address of a packet.

Aspect 11. The controller of Aspect 8, wherein the first port channel is a transport-side port channel, and wherein the first hash algorithm calculates a hash based on attributes of inner IP packets.

Aspect 12. The controller of Aspect 8, wherein the first port channel is a service side port channel, and wherein the first hash algorithm calculates a hash based on Layer 3 and Layer 4 elements of an inner packet of the network traffic.

Aspect 13. The controller of Aspect 8, wherein the first port channel is a box to box port channel, and wherein the first hash algorithm calculates a hash based on a combination of a source IP address, destination IP address, source port number, and destination port number.

Aspect 14. A non-transitory computer-readable storage medium including instructions that, when executed by at least one processor, cause the at least one processor to: cause a first change from a default algorithm for performing load balancing of network traffic transmitted by a first port channel within a network to a first hash algorithm for the load balancing of the network traffic; cause a second change from the default algorithm for performing load balancing of network traffic transmitted by a second port channel within the network to a second hash algorithm for performing the load balancing of the network traffic, the second hash algorithm is different from the first hash algorithm; and load balance the network traffic using the first hash algorithm for the network traffic over the first port channel and the second hash algorithm for the network traffic over the second port channel.

Aspect 15. The non-transitory computer-readable storage medium of Aspect 14, wherein the first port channel is within a wide area network (WAN) that supports Layer 2 connectivity over Layer 3 networks, and wherein the first hash algorithm calculates a hash based on an inner source MAC address and destination MAC address.

Aspect 16. The non-transitory computer-readable storage medium of Aspect 14, wherein the network utilizes Network Address Translation-Direct Internet Access (NAT-DIA) capabilities, and wherein the first hash algorithm calculates a hash based on a source IP address of a packet.

Aspect 17. The non-transitory computer-readable storage medium of Aspect 14, wherein the first port channel is a transport-side port channel, and wherein the first hash algorithm calculates a hash based on attributes of inner IP packets.

Aspect 18. The non-transitory computer-readable storage medium of Aspect 14, wherein the first port channel is a service side port channel, and wherein the first hash algorithm calculates a hash based on Layer 3 and Layer 4 elements of an inner packet of the network traffic.

Aspect 19. The non-transitory computer-readable storage medium of Aspect 14, wherein the first port channel is a box to box port channel, and wherein the first hash algorithm calculates a hash based on Layer 3 and Layer 4 elements of an inner packet of the network traffic.

Aspect 20. The non-transitory computer-readable storage medium of Aspect 14, wherein the non-transitory computer-readable storage medium is embedded within a controller.

What is claimed is:

1. A method comprising:

identifying a first port channel and a second port channel within a network to perform load balancing of network traffic across links of the first port channel and the second port channel, respectively, using a default algorithm;

causing a first change from the default algorithm for performing load balancing of first network traffic transmitted by the first port channel to a first hash algorithm for the load balancing of the first network traffic, wherein the first port channel is within a wide area network (WAN) that supports Layer 2 connectivity over Layer 3 networks, and wherein the first hash algorithm calculates a hash based on an inner source media access control (MAC) address and an inner destination MAC address of a packet transmitted over the first port channel;

causing a second change from the default algorithm for performing load balancing of second network traffic transmitted by the second port channel to a second hash algorithm for performing the load balancing of the second network traffic, wherein the second hash algorithm is different from the first hash algorithm and is determined based on analyzing characteristics of network data on a network segment of the second port channel different from a network segment of the first port channel; and load balancing the first network traffic using the first hash algorithm for the first network traffic over the first port channel and the second hash algorithm for the second network traffic over the second port channel.

2. The method of claim 1, wherein the network utilizes Network Address Translation-Direct Internet Access (NAT-DIA) capabilities, and wherein the second hash algorithm calculates a hash based on a source IP address of a packet.

3. The method of claim 1, wherein the second port channel is a transport-side port channel, and wherein the second hash algorithm calculates a hash based on attributes of inner IP packets.

4. The method of claim 1, wherein the second port channel is a service side port channel, and wherein the second hash algorithm calculates a hash based on a combination of source IP addresses, destination IP addresses, and a transport layer port number of the network.

5. The method of claim 1, wherein the second port channel is a box to box port channel, and wherein the second hash algorithm calculates a hash based on Layer 3 and Layer 4 elements of an inner packet of the second network traffic.

6. The method of claim 1, wherein the first hash algorithm and the second hash algorithm are configurable from a controller.

7. A controller comprising:

a storage configured to store instructions; and at least one processor configured to execute the instructions and cause the at least one processor to:

identify a first port channel and a second port channel within a network to perform load balancing of network traffic across links of the first port channel and the second port channel, respectively, using a default algorithm;

cause a first change from the default algorithm for performing load balancing of first network traffic transmitted by the first port channel to a first hash algorithm for the load balancing of the first network traffic, wherein the first port channel is within a wide area network (WAN) that supports Layer 2 connectivity over Layer 3 networks, and wherein the first hash algorithm calculates a hash based on an inner source media access control (MAC) address and an inner destination MAC address of a packet transmitted over the first port channel;

cause a second change from the default algorithm for performing load balancing of second network traffic transmitted by the second port channel to a second hash algorithm for performing the load balancing of the second network traffic, wherein the second hash algorithm is different from the first hash algorithm and is determined based on analyzing characteristics of network data on a network segment of the second port channel different from a network segment of the first port channel; and load balance the first network traffic using the first hash algorithm for the first network traffic over the first port channel and the second hash algorithm for the second network traffic over the second port channel.

8. The controller of claim 7, wherein the network utilizes Network Address Translation-Direct Internet Access (NAT-DIA) capabilities, and wherein the second hash algorithm calculates a hash based on a source IP address of a packet.

9. The controller of claim 7, wherein the second port channel is a transport-side port channel, and wherein the second hash algorithm calculates a hash based on attributes of inner IP packets.

10. The controller of claim 7, wherein the second port channel is a service side port channel, and wherein the second hash algorithm calculates a hash based on a combination of source IP addresses, destination IP addresses, and a transport layer port number of the network.

11. The controller of claim 7, wherein the second port channel is a box to box port channel, and wherein the second hash algorithm calculates a hash based on Layer 3 and Layer 4 elements of an inner packet of the second network traffic.

12. A non-transitory computer-readable storage medium including instructions that, when executed by at least one processor, cause the at least one processor to:

identify a first port channel and a second port channel within a network to perform load balancing of network traffic across links of the first port channel and the second port channel, respectively, using a default algorithm;

cause a first change from the default algorithm for performing load balancing of first network traffic transmitted by the first port channel to a first hash algorithm for the load balancing of the first network traffic, wherein the first port channel is within a wide area network (WAN) that supports Layer 2 connectivity over Layer 3 networks, and wherein the first hash algorithm calculates a hash based on an inner source media access control (MAC) address and an inner destination MAC address of a packet transmitted over the first port channel;

cause a second change from the default algorithm for performing load balancing of second network traffic transmitted by the second port channel within the network to a second hash algorithm for performing the load balancing of the second network traffic, wherein the second hash algorithm is different from the first hash algorithm and is determined based on analyzing characteristics of network data on a network segment of the second port channel different from a network segment of the first port channel; and load balance the first network traffic using the first hash algorithm for the first network traffic over the first port channel and the second hash algorithm for the second network traffic over the second port channel.

13. The non-transitory computer-readable storage medium of claim 12, wherein the network utilizes Network Address Translation-Direct Internet Access (NAT-DIA) capabilities, and wherein the second hash algorithm calculates a hash based on a source IP address of a packet.

14. The non-transitory computer-readable storage medium of claim 12, wherein the second port channel is a transport-side port channel, and wherein the second hash algorithm calculates a hash based on attributes of inner IP packets.

15. The non-transitory computer-readable storage medium of claim 12, wherein the second port channel is a service side port channel, and wherein the second hash algorithm calculates a hash based on a combination of source IP addresses, destination IP addresses, and a transport layer port number of the network.

16. The non-transitory computer-readable storage medium of claim 12, wherein the second port channel is a box to box port channel, and wherein the second hash algorithm calculates a hash based on Layer 3 and Layer 4 elements of an inner packet of the second network traffic.

17. The non-transitory computer-readable storage medium of claim 12, wherein the non-transitory computer-readable storage medium is embedded within a controller.

* * * * *